US008816941B2

(12) United States Patent
Kim

(10) Patent No.: US 8,816,941 B2
(45) Date of Patent: Aug. 26, 2014

(54) DISPLAY DEVICE AND DRIVING METHOD THEREOF

(75) Inventor: Do-Ik Kim, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 694 days.

(21) Appl. No.: 13/004,951

(22) Filed: Jan. 12, 2011

(65) Prior Publication Data

US 2011/0292006 A1  Dec. 1, 2011

(30) Foreign Application Priority Data

May 25, 2010 (KR) ........................ 10-2010-0048736

(51) Int. Cl.
*G09G 3/30* (2006.01)

(52) U.S. Cl.
USPC ............... 345/76; 345/77; 345/78; 345/204; 345/690; 315/169.1; 315/169.3

(58) Field of Classification Search
USPC .......... 345/76–100, 204, 690; 348/35, 43, 48, 348/51, 53; 315/169.1–169.3
See application file for complete search history.

(56) References Cited

U.S. PATENT DOCUMENTS

| 2007/0132709 A1* | 6/2007 | Kawaguchi ................... 345/102 |
| 2010/0141646 A1 | 6/2010 | Tanabe |
| 2011/0096146 A1* | 4/2011 | Hulyalkar et al. ............. 348/43 |
| 2011/0116166 A1* | 5/2011 | Jung et al. ..................... 359/465 |

FOREIGN PATENT DOCUMENTS

| JP | 2000-036969 | 2/2000 |
| JP | 2002-199416 | 7/2002 |
| JP | 2003-070025 | 3/2003 |
| JP | 2004-112814 A | 4/2004 |
| JP | 2004-165713 | 6/2004 |
| JP | 2008-033209 | 2/2008 |
| JP | 2008-262126 | 10/2008 |
| JP | 2009-175346 A | 8/2009 |
| JP | 2009-217142 A | 9/2009 |
| JP | 2009-244838 A | 10/2009 |
| JP | 2010-039385 | 2/2010 |
| JP | 2010-102151 A | 5/2010 |
| KR | 10-2008-0066504 A | 7/2008 |
| KR | 10-2010-0017725 A | 2/2010 |
| KR | 10-2010-0023613 A | 3/2010 |
| KR | 10-2011-0054834 A | 5/2011 |
| WO | WO 2007/144989 A1 | 12/2007 |
| WO | WO 2009/013806 A1 | 1/2009 |

* cited by examiner

*Primary Examiner* — Jennifer Nguyen
(74) *Attorney, Agent, or Firm* — Christie, Parker & Hale, LLP

(57) ABSTRACT

A display device includes a scan driver transmitting a plurality of scan signals to a plurality of scan lines, a data driver transmitting a plurality of data signals to a plurality of data lines, a display unit including a plurality of pixels connected to corresponding scan lines and corresponding data lines, and respectively receiving the corresponding data signal when the plurality of pixels are selected with the corresponding scan signal, and a timing controller controlling the scan driver and the data driver, dividing one frame period into a first viewpoint image display period, a second viewpoint image display period, and a black image display period, and generating image data signals corresponding to the first viewpoint image display period, the second viewpoint image display period, and the black image display period, and supplying the respective image data signals to the data driver, wherein the black image display period is shorter than the first viewpoint image display period and the second viewpoint image display period, and the image data signal corresponding to the black image display period is a black image data signal controlling the plurality of pixels not to emit light.

27 Claims, 7 Drawing Sheets

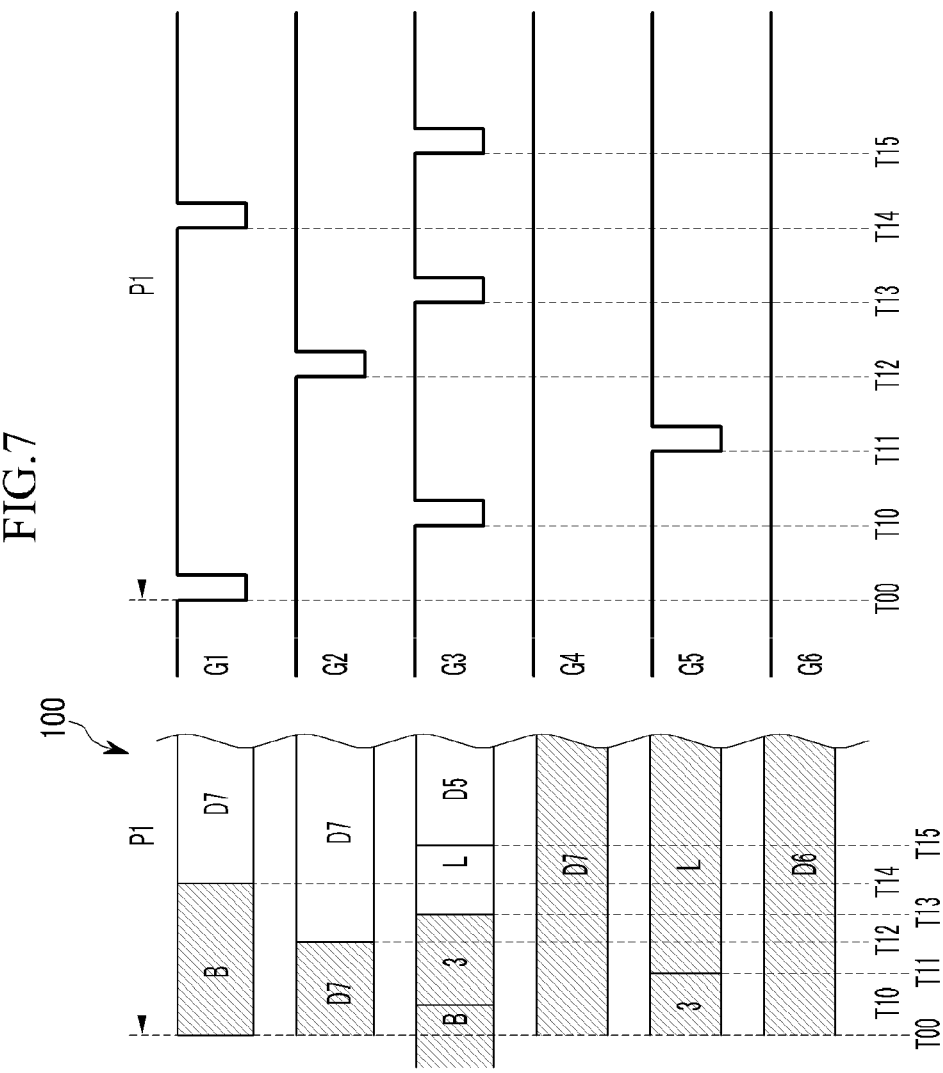

DISPLAY DEVICE AND DRIVING METHOD THEREOF

CROSS-REFERENCE TO RELATED APPLICATION

This application claims priority to and the benefit of Korean Patent Application No. 10-2010-0048736 filed in the Korean Intellectual Property Office on May 25, 2010, the entire disclosure of which is incorporated herein by reference.

BACKGROUND

1. Field

An aspect of the present invention relates to a display device and a driving method thereof. More particularly, an aspect of the present invention relates to a driving method for driving a stereoscopic video signal in a display device generating a three-dimensional or stereoscopic image.

2. Description of the Related Art

Currently, various flat panel displays having reduced weight and volume, as compared to cathode ray tubes, are being developed. A flat panel display includes a liquid crystal display (LCD), a field emission display (FED), a plasma display panel (PDP), and an organic light emitting diode (OLED) display.

The OLED display of the flat panel display displays an image using an OLED that generates light by a recombination of electrons and holes, has a fast response speed, is driven with low power consumption, and has excellent luminous efficiency, luminance, and viewing angle, and thus has been in the spotlight. In general, a plurality of pixels emitting light in the organic light emitting diode (OLED) display include an organic light emitting diode (OLED). The organic light emitting diode (OLED) generates light of a predetermined luminance corresponding to a data current supplied from a pixel circuit.

Digital driving as one among expression methods of grayscales of the organic light emitting diode (OLED) display, controls the time that the organic light emitting diode (OLED) of the pixel is turned on. In the case of the organic light emitting diode (OLED) display according to the digital driving, one frame is divided into a plurality of sub-frames, and a light emitting period of each sub-frame is appropriately determined for a grayscale display. Among the plurality of sub-frames of one frame, the pixel emits light during a sub-frame selected according to a video signal for the expression of grayscales.

In contrast, to display a stereoscopic or three-dimensional image, at least two images corresponding to at least two different viewing points must be displayed during one frame display period. In general, a three-dimensional stereoscopic image display device displays a left-eye image and a right-eye image corresponding to two eyes (that is, a left eye and a right eye) in one frame period.

That is, the period of one frame is divided into a left-eye image display period and a right-eye image display period. The left-eye image display period includes a plurality of sub-frames. The right-eye image display period includes a plurality of sub-frames.

Furthermore, to prevent crosstalk of the left-eye image and the right-eye image, a black image display period may be positioned within one frame period. The black image display period displays a black image in the whole organic light emitting diode (OLED) display after the left-eye image display period and the right-eye image display period are respectively completed. In this case, the driving frequency of the organic light emitting diode (OLED) display is very high.

Particularly, in a large organic light emitting diode (OLED) display, an incorrect image display operation may occur in the display panel for the display device, and driving power consumption of a driver of the display device by the high driving frequency is increased. As a result, the cost of the organic light emitting diode (OLED) display is increased such that improvement and research therefor are required.

The above information disclosed in this Background section is only for enhancement of understanding of the background of the invention and therefore it may contain information that does not form the prior art that is already known in this country to a person of ordinary skill in the art.

SUMMARY

An aspect of the present invention provides a display device produced with an economical module production cost by being correctly driven and reducing driving power consumption in a display panel of a large size through a low driving frequency, and driving the display device to produce a three-dimensional or stereoscopic image.

According to another aspect of the present invention, there is provided a driving method of a display device that is capable of reducing an RC-delay of the display panel, an erroneous operation of a circuit installed in a TFT, and driving timing of a driver IC and a controller when driving a three-dimensional or stereoscopic image of the display device by reducing the driving frequency.

A display device according to an exemplary embodiment of the present invention includes: a scan driver transmitting a plurality of scan signals to a plurality of scan lines; a data driver transmitting a plurality of data signals to a plurality of data lines; a display unit including a plurality of pixels connected to corresponding scan lines among the plurality of scan lines and corresponding data lines among the plurality of data lines, and respectively receiving corresponding data signals when the plurality of pixels are transmitted the corresponding scan signals; and a timing controller controlling the scan driver and the data driver, dividing one frame period into a first viewpoint image display period, a second viewpoint image display period, and a black image display period, and generating image data signals corresponding to the first viewpoint image display period, the second viewpoint image display period, and the black image display period, and supplying them to the data driver, wherein the black image display period is shorter than the first viewpoint image display period and the second viewpoint image display period, and the image data signal corresponding to the black image display period is a black image data signal for which the plurality of pixels do not emit light.

According to another aspect of the present invention, the image data signal corresponding to the first viewpoint image display period and the image data signal corresponding to the second viewpoint image display period may be a left eye image data signal and a right eye image data signal, respectively.

According to another aspect of the present invention, the data driver may receive the first viewpoint image data signal corresponding to the first viewpoint image display period to generate a plurality of first viewpoint data signals, the second viewpoint image data signal corresponding to the second viewpoint image display period to generate a plurality of second viewpoint data signals, and the black image data signal corresponding to the black image display period to generate a plurality of black data signals, respectively.

According to another aspect of the present invention, the first viewpoint image display period may include a plurality of first sub-frames, the scan driver may transmit the scan signals corresponding to the plurality of first sub-frames to the corresponding scan lines, and the data driver may supply the plurality of first viewpoint data signals to the plurality of data lines at the viewpoint where the corresponding scan signals are transmitted to the corresponding scan lines.

According to another aspect of the present invention, the second viewpoint image display period may include a plurality of second sub-frames, the scan driver may transmit the scan signals corresponding to the plurality of second sub-frames to the corresponding scan lines, and the data driver may supply the plurality of second viewpoint data signals to the plurality of data lines at the viewpoint where the corresponding scan signals are transmitted to the corresponding scan lines.

According to another aspect of the present invention, the black image display period may include a plurality of black sub-frames, the scan driver may transmit the scan signals corresponding to the plurality of black sub-frames to the corresponding scan lines, and the data driver may supply the plurality of black data signals to the plurality of data lines at the viewpoint where the corresponding scan signals are transmitted to the corresponding scan lines.

According to another aspect of the present invention, one frame may be divided into a plurality of sub-frames, the first viewpoint image data signal corresponding to the first viewpoint image display period may be supplied during at least two first sub-frame periods among the plurality of sub-frames, the second viewpoint image data signal corresponding to the second viewpoint image display period may be supplied during at least two second sub-frame periods among the plurality of sub-frames, and a sequence wherein at least two scan signals corresponding to at least two first sub-frames are transmitted may be the same as a sequence wherein at least two scan signals corresponding to at least two second sub-frames are transmitted.

According to another aspect of the present invention, at least two first sub-frames and at least two second sub-frames may respectively include at least one blank sub-frame where the data driver supplies a black data signal for not emitting light of the pixel to the corresponding data line among the plurality of data lines.

According to another aspect of the present invention, the black image data signal corresponding to the black image display period may be supplied during at least two black sub-frame periods among the plurality of sub-frames. The sequence wherein at least two scan signals corresponding to the black sub-frame are transmitted may be the same as the sequence wherein at least two scan signals corresponding to at least two first sub-frames or at least two second sub-frames are transmitted.

According to another aspect of the present invention, the black image display period may be longer than the longest sub-frame period among at least two first sub-frame periods or at least two second sub-frame periods.

According to another aspect of the present invention, the sequence wherein at least two scan signals corresponding to at least two black sub-frames are transmitted may be the same as the sequence wherein at least two scan signals corresponding to a plurality of sub-frames included from an initial viewpoint among at least two first sub-frame periods or at least two second sub-frame periods to the viewpoint corresponding to at least two black sub-frame periods are transmitted.

According to another aspect of the present invention, the one frame period may be divided into the first viewpoint image display period, the second viewpoint image display period, and the black image display period, and the black image display period may be started at the viewpoint where the first viewpoint image display period and the second viewpoint image display period are finished.

According to another aspect of the present invention, a method of driving a display device according to an exemplary embodiment of the present invention, the display device including a plurality of pixels, wherein one frame is divided into a first viewpoint image display period, a second viewpoint image display period, and a black image display period, the first viewpoint image display period including a plurality of first sub-frames, the second viewpoint image display period including a plurality of second sub-frames, and the black image display period including a plurality of black sub-frames, includes: generating and supplying a first viewpoint image data signal, a second viewpoint image data signal, and a black image data signal respectively corresponding to the first viewpoint image display period, the second viewpoint image display period, and the black image display period; light-emitting the plurality of pixels during the plurality of first sub-frame periods according to the first viewpoint image data signal; not light-emitting the plurality of pixels during the plurality of black sub-frame periods according to the black image data signal; light-emitting the plurality of pixels during the plurality of second sub-frame periods according to the second viewpoint image data signal; and not light-emitting the plurality of pixels during the plurality of black sub-frame periods according to the black image data signal, wherein the black image display period is shorter than the first viewpoint image display period and the second viewpoint image display period.

According to another aspect of the present invention, the first viewpoint image data signal and the second viewpoint image data signal may be a left eye image data signal and a right eye image data signal, respectively.

According to another aspect of the present invention, the image data signal corresponding to the black image display period may not emit the plurality of pixels.

According to another aspect of the present invention, in the generating and the supplying of the first viewpoint image data signal, the second viewpoint image data signal, and the black image data signal, the timing controller of the display device may generate the first viewpoint image data signal, the second viewpoint image data signal, and the black image data signal and may supply them to a data supply unit of the display device, and the data supply unit may respectively receive the first viewpoint image data signal to generate a plurality of first viewpoint data signals, the second viewpoint image data signal to generate a plurality of second viewpoint data signals, and the black image data signal to generate a plurality of black data signals.

According to another aspect of the present invention, the plurality of first viewpoint data signals may be supplied to the plurality of data lines connected to the data driver at the viewpoint where the scan driver of the display device transmits the scan signals corresponding to the plurality of first sub-frames to the corresponding scan lines.

According to another aspect of the present invention, the plurality of second viewpoint data signals may be supplied to the plurality of data lines connected to the data driver at the viewpoint where the scan driver of the display device transmits the scan signals corresponding to the plurality of second sub-frames to the corresponding scan lines.

According to another aspect of the present invention, the plurality of black data signals may be supplied to the plurality of data lines connected to the data driver at the viewpoint where the scan driver of the display device transmits the scan signals corresponding to the plurality of black sub-frames to the corresponding scan lines.

According to another aspect of the present invention, the first viewpoint image data signal may be supplied during the plurality of first sub-frame periods, the second viewpoint image data signal may be supplied during the plurality of second sub-frame periods, and the black image data signal may be supplied during the plurality of black sub-frame periods. The sequence wherein a plurality of scan signals corresponding to a plurality of first sub-frames are transmitted may be the same as the sequence wherein a plurality of scan signals corresponding to a plurality of second sub-frames are transmitted.

According to another aspect of the present invention, the plurality of first sub-frames and the plurality of second sub-frames may respectively include at least one blank sub-frame in which the data driver of the display device supplies a black data signal not light-emitting the pixel to the corresponding data line among the plurality of data lines.

According to another aspect of the present invention, the sequence in which a plurality of scan signals corresponding to the plurality of black sub-frames are transmitted may be the same as the sequence in which a plurality of scan signals corresponding to the plurality of first sub-frames or the plurality of second sub-frames are transmitted.

According to another aspect of the present invention, the sequence in which a plurality of scan signals corresponding to a plurality of black sub-frames are transmitted may be the same as the sequence in which a plurality of scan signals corresponding to a plurality of sub-frames included from an initial viewpoint among a plurality of first sub-frame periods or a plurality of second sub-frame periods to the viewpoint corresponding to a plurality of black sub-frame periods are transmitted.

According to another aspect of the present invention, the plurality of black sub-frame periods may be longer than the longest sub-frame period among the plurality of first sub-frame periods and the plurality of second sub-frame periods.

According to an aspect of the present invention, in the display device for driving the three-dimensional or stereoscopic image, the driving frequency is largely reduced such that the low speed operation is possible, and thereby the power consumption of the module circuit and the module production cost may be decreased.

Also, according to another aspect of the present invention, the method for driving the three-dimensional or stereoscopic image through the low driving frequency is provided such that the driving timing is sufficient, and the RC-delay of the display panel, the erroneous operation of the TFT installation circuit, and the driving timing of the driver IC and the controller may be solved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is an elongated view of a portion of the driving waveform of FIG. 6 and a driving timing diagram of a scan signal according thereto.

DETAILED DESCRIPTION

Figure 1:
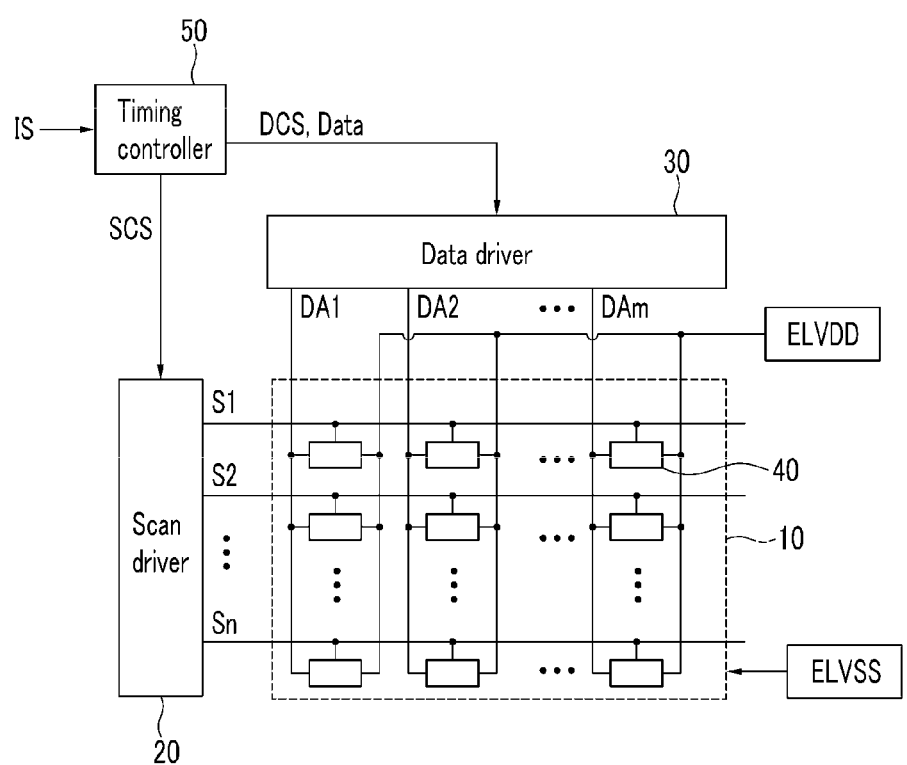
FIG. 1 is a block diagram of a display device according to an exemplary embodiment of the present invention.

Hereinafter, some exemplary embodiments of the present invention will be described with reference to the accompanying drawings in order for those skilled in the art to be able to readily implement them. As those skilled in the art would realize, the described embodiments may be modified in various different ways, all without departing from the spirit or scope of the present invention.

Further, in the exemplary embodiments, constituent elements having the same construction are assigned the same reference numerals and are representatively described in connection with a first exemplary embodiment. In the remaining embodiments, only constituent elements that are different from those of the first exemplary embodiment are described.

In order to clarify the aspects of the present invention, parts that are not connected with the description will be omitted, and the same elements or equivalents are referred to by the same reference numerals throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a block diagram of a display device according to an exemplary embodiment of the present invention. Referring to FIG. 1, the display device includes a display unit 10, a scan driver 20, a data driver 30, and a timing controller 50. The display unit 10 includes a plurality of pixels 40 connected to scan lines S1 to Sn and data lines DA1 to DAm. The scan driver 20 supplies a scan signal to the scan lines S1 to Sn and drives the scan lines. The data driver 30 supplies a data signal to the data lines DA1 to DAm and drives the data lines. The timing controller 50 controls the scan driver 20 and the data driver 30.

The timing controller 50 generates a data driving control signal DCS and a scan driving control signal SCS corresponding to synchronization signals supplied from the outside. The data driving control signal DCS generated in the timing controller 50 is supplied to the data driver 30, and the scan driving control signal SCS is supplied to the scan driver 20. Also, the timing controller 50 converts the video signal IS supplied from the outside into the image data signal DATA and supplies the image data signal DATA to the data driver 30. The image data signal DATA includes a first viewpoint image data signal and a second viewpoint image data signal.

In detail, the first viewpoint is a left eye viewpoint of a viewer, and the second viewpoint is the right eye viewpoint of the viewer, or vice versa. Accordingly, the first viewpoint image data signal may be the left eye image data signal, and the second viewpoint image data signal may be the right eye image data signal. For convenience, it is assumed that the first viewpoint is for the left eye and the second viewpoint is for the right eye.

The organic light emitting diode (OLED) display, according to an exemplary embodiment of the present invention, sequentially displays the left-eye image and the right-eye image corresponding to two viewpoints in order to display the three-dimensional or stereoscopic image. Additional spectacles may be required to respectively transmit the left-eye image and the right-eye image to the two eyes, although it is understood other techniques can be used or developed to create a like effect without use of eyeglasses or spectacles.

That is, the viewer generally wears the spectacles for the image to be projected during the period in which the left-eye image is displayed to only the left eye and for the image to be projected during the period in which the right-eye image is displayed to only the right eye.

The data driver 30 supplies the plurality of data signals to the plurality of data lines DA1 to DAm for all of the plurality of sub-frame periods included in one frame. In detail, the data driver 30 generates a plurality of left eye data signals and a plurality of right eye data signals according to a plurality of left eye image data signals and a plurality of right eye image data signals that are transmitted from the timing controller 50, and transmits them to the plurality of data lines according to the data driving control signal DCS.

Also, the timing controller 50 generates the image data signal corresponding to a black image display period during a predetermined period from the viewpoint when the left-eye image display period and the right-eye image display period are finished as a black image data signal. The black image data signal is the image data signal in which the pixel does not emit light. That is, the image data signal for which the current is not supplied to the organic light emitting diode (OLED).

The data driver 30 generates the plurality of black data signals corresponding to the black image data signal and transmits the plurality of black data signals to the plurality of data lines DA1 to DAm according to the data driving control signal.

In detail, the data driver 30 transmits the plurality of data signals controlling the light emitting of the plurality of pixels 40 in synchronization with the viewpoint where the scan signal having a gate on voltage corresponding to each sub-frame is supplied through the plurality of data lines. The gate on voltage is the level for turning on a switching transistor for the data signal to be transmitted to the gate electrode of the driving transistor transmitting the driving current to the organic light emitting diode (OLED). This will be described with reference to the pixel structure of FIG. 2.

Here, the plurality of left eye data signals are transmitted during the left-eye image display period through the plurality of data lines DA1 to DAm, the plurality of right eye data signals are transmitted during the right-eye image display period, and the plurality of black data signals are transmitted during the black image display period.

The scan driver 20 supplies the scan signal having the gate voltage to the corresponding scan line among the plurality of scan lines S1 to Sn in synchronization with the starting point of each sub-frame. The plurality of pixels 40 connected to the scan line supplied with the scan signal having the gate on voltage among the plurality of scan lines S1 to Sn are selected. The plurality of pixels 40 selected by the scan signal receive one among the left eye data signal, the right eye data signal, and the black data signal according to the corresponding sub-frame from the plurality of data lines DA1 to DAm. Here, the corresponding sub-frame represents the sub-frame corresponding to the scan signal having the gate on voltage.

The first power source ELVDD and the second power source ELVSS supply two driving voltages to operate the plurality of pixels 40. The two driving voltages include the first driving voltage of a high level supplied from the first power source ELVDD and the second driving voltage of the low level supplied from the second power source ELVSS.

Figure 2:
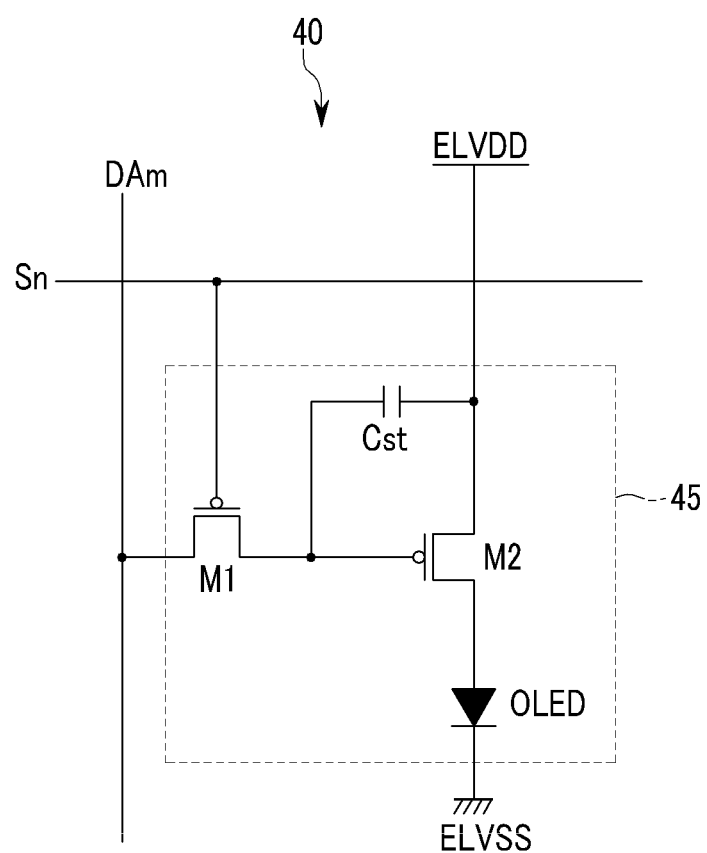
FIG. 2 is a circuit diagram showing a structure of a pixel circuit of the display device of FIG. 1.

Next, the pixel circuit structure of the display device of FIG. 1 will be described with reference to the circuit diagram shown in FIG. 2. FIG. 2 is a pixel circuit 45 of the corresponding pixel 40 among the plurality of pixels of the display device of FIG. 1. Referring to FIG. 2, the pixel circuit 45 includes a switching transistor M1, a driving transistor M2, a storage capacitor Cst, and an organic light emitting diode (OLED). FIG. 2 is one exemplary embodiment of the driving circuit of the pixel, however this structure is not limited and the structure of the pixel circuit disclosed in the art may be variously applied.

In detail, the pixel circuit 45 includes a switching transistor M1. The switching transistor M1 has a gate electrode connected to the corresponding scan line among the plurality of scan lines, a source electrode connected to the corresponding data line among the plurality of data lines, and a drain electrode connected to a node connected to one terminal of the storage capacitor Cst and the gate electrode of the driving transistor M2.

Also, the pixel circuit 45 includes the driving transistor M2 having the gate electrode connected to the drain electrode of the switching transistor M1, the source electrode connected to the first power source ELVDD, and the drain electrode connected to an anode of the organic light emitting diode (OLED).

The storage capacitor Cst includes one terminal connected to the node connected to the drain electrode of the switching transistor M1 and the gate electrode of the driving transistor M2 and the other terminal connected to the source electrode of the driving transistor M2, thereby maintaining a voltage difference between the gate electrode and the source electrode of the driving transistor M2 during the sub-frame period.

The anode of the organic light emitting diode (OLED) is connected to the drain electrode of the driving transistor M2, and the cathode thereof is connected to the second power source ELVSS.

When the switching transistor M1 is turned on according to the scan signal transmitted through the corresponding scan line Sn, the data signal transmitted through the turned-on switching transistor M1 is transmitted to the gate electrode of the driving transistor M2. Accordingly, the voltage difference between the gate electrode and the source electrode of the driving transistor M2 is the first driving voltage of the data signal and the first power source, and the driving current flows in the driving transistor M2 according to the corresponding voltage difference.

The driving current is transmitted to the organic light emitting diode (OLED), and the organic light emitting diode (OLED) emits the light according to the transmitted driving current.

If the plurality of scan signals having the gate on voltage level are supplied to the corresponding scan line of the plurality of scan lines S1 to Sn, the plurality of switching transistors M1 connected to the corresponding scan lines are turned on. The plurality of data lines DA1 to DAm respectively receive one of the left eye data signal, the right eye data signal, and the black data signal in synchronization with the viewpoint where the scan signal having the gate on voltage is supplied.

One data signal of the left eye data signal, the right eye data signal, and the black data signal transmitted to the plurality of data lines DA1 to DAm through the turned-on plurality of switching transistors M1 is transmitted to the driving transistor M2 of the plurality of pixels 40 such that each organic light emitting diode (OLED) of the plurality of pixels 40 executes the light emitting or the non-light emitting during the corresponding sub-frame period according to the transmitted data signal.

Figure 3:
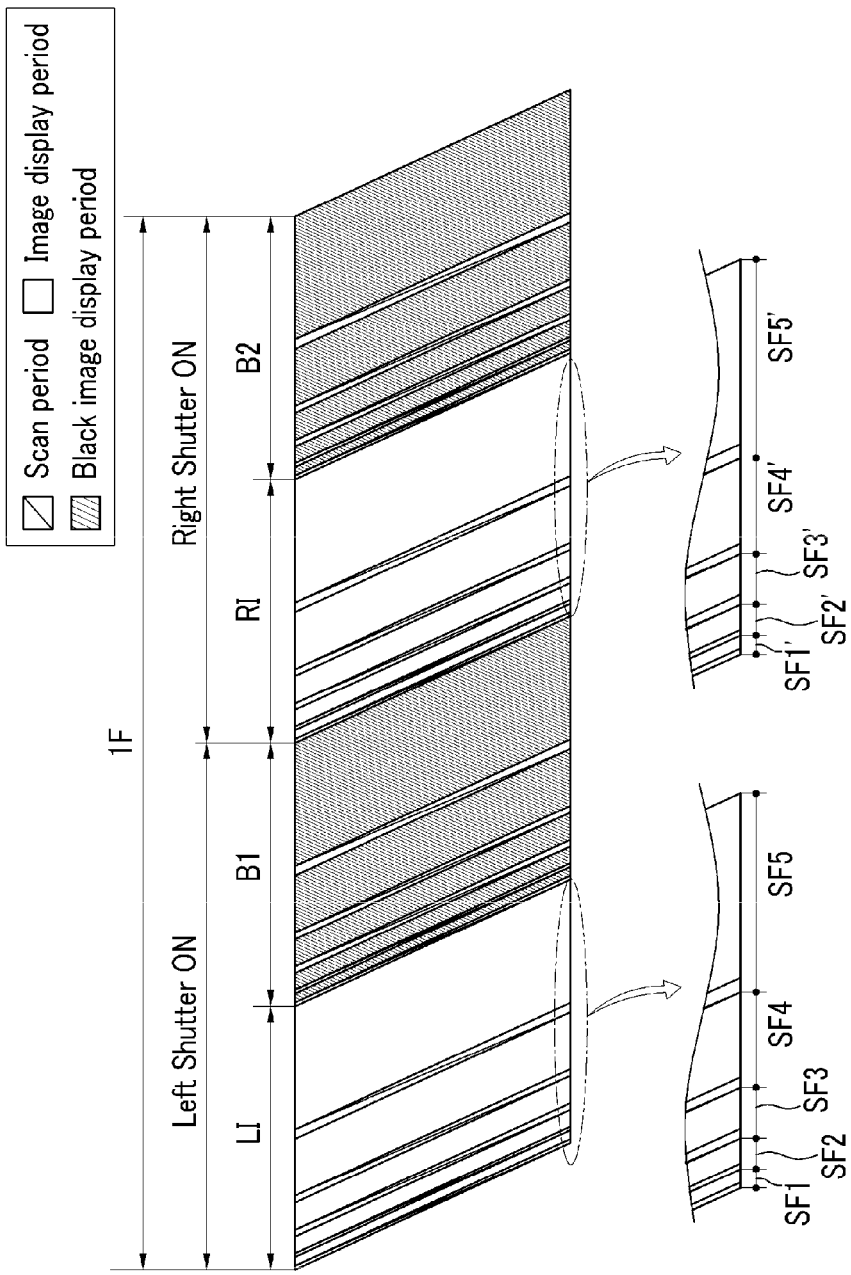
FIG. 3 is a driving waveform showing a driving method of a stereoscopic image.

FIG. 3 is a driving waveform showing a driving method of a three-dimensional or stereoscopic image. In detail, the left-eye image and the right-eye image are alternately displayed to display the 3D stereoscopic image. One frame 1F includes black image display periods B1 and B2 after the left-eye image display period LI and the right-eye image display period RI. Here, the left-eye image display period LI, the right-eye image display period RI, and the black image display periods B1 and B2 are equal to each other, and the number of sub-frames included in each period and the arrangement of the plurality of sub-frames are equal to each other.

As shown in FIG. 3, the left eye shutter of the spectacles is only turned on during the left-eye image display period LI and the black image display period B1 such that the image is projected only to the left eye. Also, the right eye shutter of the spectacles is only turned on during the right-eye image display period RI and the black image display period B2 such that the image is projected only to the right eye.

The left-eye image display period LI among the period in which the left shutter is in the on state has the arrangement of a plurality of sub-frames SF1 to SF5, and the plurality of scan signals having the gate on voltage are sequentially transmitted to the plurality of scan lines in synchronization with the starting point of each sub-frame. Here, when the plurality of scan signals are transmitted, the plurality of left eye data signals are transmitted to the plurality of pixels through the plurality of data lines. Thus, each organic light emitting diode (OLED) of the plurality of pixels emits the image during the corresponding sub-frame according to the left eye data signal, thereby displaying the left-eye image.

The right-eye image display period RI among the period in which the right shutter is in the on state has the arrangement of a plurality of sub-frames SF1' to SF5'. Also, the plurality of scan signals having the gate on voltage are sequentially transmitted to the plurality of scan lines in synchronization with the starting point of each sub-frame, and here, the plurality of right eye data signals transmitted through the plurality of data lines are transmitted to the plurality of pixels. Thus, each organic light emitting diode (OLED) of the plurality of pixels 40 emits light during the corresponding sub-frame according to the right eye data signal, thereby displaying the right-eye image.

Also, in FIG. 3, the black image display periods B1 and B2 are periods for preventing the mixture of the right and left images. The black image display period B1 after the left-eye image display period LI has the same sub-frames SF1-SF5 as the sub-frames of the left-eye image display period LI. The plurality of scan signals having the gate on voltage are sequentially transmitted to the plurality of scan lines in synchronization with the starting point of each sub-frame, however, at this time, the plurality of black data signals are transmitted to the plurality of pixels through the plurality of data lines during the corresponding sub-frame such that each organic light emitting diode (OLED) of the plurality of pixels (OLED) does not emit the light.

On the other hand, the black image display period B2 after the right-eye image display period RI has the same sub-frames SF1'-SF5' as the sub-frames of the right-eye image display period RI. The plurality of scan signals having the gate on voltage are sequentially transmitted to the plurality of scan lines in synchronization with the starting point of each sub-frame, however, at this time, the plurality of black data signals are transmitted to the plurality of pixels through the plurality of data lines during the corresponding sub-frame such that each organic light emitting diode (OLED) of the plurality of pixels (OLED) does not emit the light.

The black image display period B1 in which the black data signal is supplied such that the light emitting is not executed may be inserted in the left-eye image display period LI in which the left eye data signal is supplied such that the light emitting is executed during the corresponding sub-frame period, and the black image display period B2 in which the black data signal is supplied such that the light emitting is not executed may be inserted in the right-eye image display period RI in which the right eye data signal is supplied such that the light emitting is executed during the corresponding sub-frame period.

As described above, when 1 frame cycle is determined to be 1/60 sec, to transmit the plurality of data signals to the display unit during the left-eye image display period LI, the black image display period B1, the right-eye image display period RI, and the black image display period B2, the driving frequency of the organic light emitting diode (OLED) display in 1 frame cycle is determined to be 240 Hz. In general, this digital driving has a frequency increased by four times compared with the 2D display driving.

In this way, if the driving frequency is increased to the high frequency, it is difficult to correctly drive a display panel of a large size because of RC delay of the data/scan lines, and the driving power consumption is increased. Also, it is difficult to obtain a period to compensate the threshold voltage in the pixel circuit under the high frequency driving. The integrated circuit of the data driver and the scan driver must be designed to correspond to the high speed driving such that the module cost of the whole display device is increased.

Figure 4:
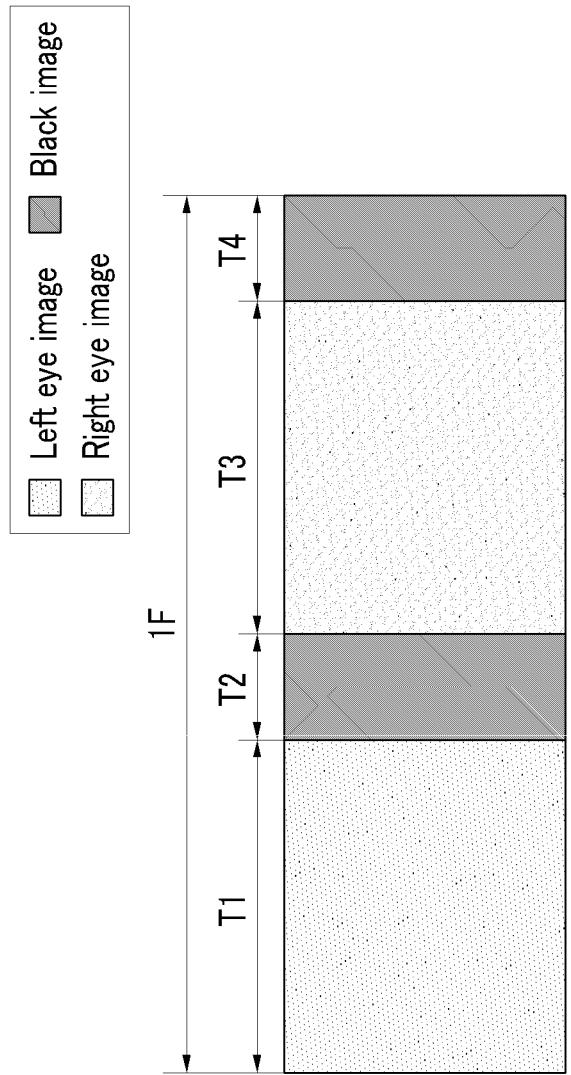
FIG. 4 is a driving waveform showing a driving method of a three-dimensional or stereoscopic image according to an exemplary embodiment of the present invention.

FIG. 4 shows the driving waveform diagram of a driving method of a three-dimensional or stereoscopic image in a display device according to an exemplary embodiment of the present invention to solve the problems of the above-described method described in relation to FIG. 3.

Referring to FIG. 4, to create the three-dimensional or stereoscopic image, one frame cycle includes a left-eye image display period T1, a black image display period T2, a right-eye image display period T3, and a black image display period T4.

The plurality of scan signals are transmitted in synchronization with the starting point of the corresponding sub-frame among the plurality of sub-frames of one frame.

One of a plurality of left eye data signals, a plurality of right eye data signals, and a plurality of black data signals is transmitted to the plurality of pixels 40 in synchronization with the viewpoint of the scan signal corresponding to the plurality of sub-frames which is transmitted to the corresponding scan line. The plurality of organic light emitting diodes (OLED) execute the light emitting or the non-light emitting according to the plurality of transmitted data signals.

In detail, the plurality of pixels 40 corresponding to the plurality of sub-frames (hereinafter, the left eye frame) included in the left-eye image display period T1 receive the plurality of corresponding left eye data signals. Thus, each organic light emitting diode (OLED) of the plurality of pixels 40 emits the light according to the current corresponding to the left eye data signal. Here, the display unit 10 displays the left-eye image.

The plurality of pixels 40 corresponding to the plurality of sub-frames (hereinafter, the right eye frame) included in the right-eye image display period T3 receive the plurality of corresponding right eye data signals. Thus, each organic light emitting diode (OLED) of the plurality of pixels 40 emits the light according to the current corresponding to the right eye data signal. Here, the display unit 10 displays the right-eye image.

The plurality of pixels corresponding to the plurality of sub-frames (hereinafter, the black frame) included in the black image display periods T2 and T4 receive the plurality of corresponding black data signals. The organic light emitting diode (OLED) of the plurality of pixels 40 transmitted with the black data signal does not execute the light emitting such that the display unit 10 displays the black image.

According to another exemplary embodiment of the present invention, left-eye image display period T1 and the right-eye image display period T3 may be repeated in the opposite sequence.

Referring to FIG. 4, the black image display periods T2 and T4 in the organic light emitting diode (OLED) display according to an exemplary embodiment of the present invention is shorter than left-eye image display period T1 and the right-eye image display period T3.

More preferably, the black image display periods T2 and T4 must be longer than the longest length of the sub-frame period in which the light is emitted among the plurality of left eye frames or the plurality of right eye frames to completely divide the right and left images. If the longest sub-frame emitting the light among the plurality of left eye frames or the plurality of right eye frames is divided and driven, the black image display periods T2 and T4 may be automatically reduced such that the driving frequency may be decreased.

As described above, in the case that 1 frame cycle is determined to be 1/60 sec, if it is assumed that the longest sub-frame emitting the light among the plurality of left eye frames or the plurality of right eye frames is 25% of a digital driving cycle, the driving cycle of the three-dimensional or stereoscopic image dividing the right and left images may be 1/150 sec longer than 1/240 sec of the conventional driving cycle when the black data signal includes the transmitted black image display period. Accordingly, the driving frequency of the organic light emitting diode (OLED) display is decreased, and one frame period is relatively increased compared with the conventional method such that the image display period may be sufficiently obtained, thereby generating the three-dimensional or stereoscopic image.

Thus, the low luminance and the threshold voltage compensation period that are generated by the reduction of the display period when displaying the three-dimensional or stereoscopic image may be solved.

Figure 5:
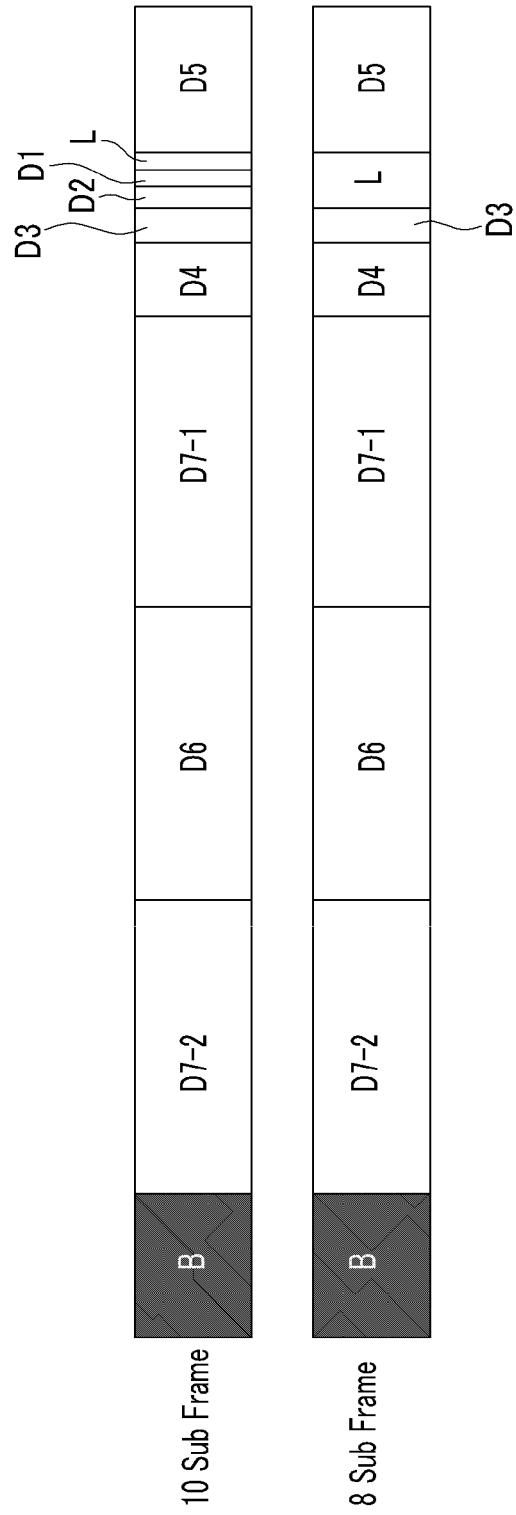
FIG. 5 is a schematic diagram of a plurality of sub-frames divided from one frame period according to an exemplary embodiment of the present invention.

FIG. 5 is a schematic diagram of a plurality of sub-frames divided from one frame period according to an exemplary embodiment of the present invention. One frame period includes a plurality of sub-frames. An exemplary embodiment includes eight sub-frames having a blank sub-frame B, and another exemplary embodiment may include ten sub-frames having a blank sub-frame B. However, it is understood that the number of sub-frames is not specifically limited.

The blank sub-frame B is a predetermined period to solve the discord of the synchronization generated although a plurality of left eye frames and a plurality of right eye frames are appropriately arranged in the corresponding display period.

For example, the difference between the left-eye image display period and the plurality of left eye frame periods is determined as the blank sub-frame included in the left-eye image display period. For example, if the sum period of the left eye frames of D7-1, D7-2, D6, D5, D4, D3, D2, D1, and L is less than the left-eye image display period, the period difference therebetween is assigned as the blank sub-frame.

The right-eye image display period is the same.

As shown in FIG. 5, a plurality of left eye and right eye frames may include ten sub-frames B, L, D1, D2, D3, D4, D5, D6, D7-1, and D7-2 or eight sub-frames B, L, D3, D4, D5, D6, D7-1, and D7-2.

When the plurality of left eye and right eye frames are ten sub-frames, the longest sub-frame is the period D7, and in an exemplary embodiment of the present invention, the longest sub-frame period is divided into D7-the first period and D7-the second period, and at least one sub-frame is disposed between two divided sub-frames.

The black image display period according to an exemplary embodiment of the present invention includes the black frame supplied with the black data signal. It is determined that the black frame period is longer than the longest sub-frame among the left eye frames or right eye frames, as shown in FIG. 5, and accordingly if the black frame is inserted by the period of D7-1 or D7-2 that are divided from the longest sub-frame D7, the black image display period may be automatically reduced such that the driving frequency may be decreased.

Figure 6:
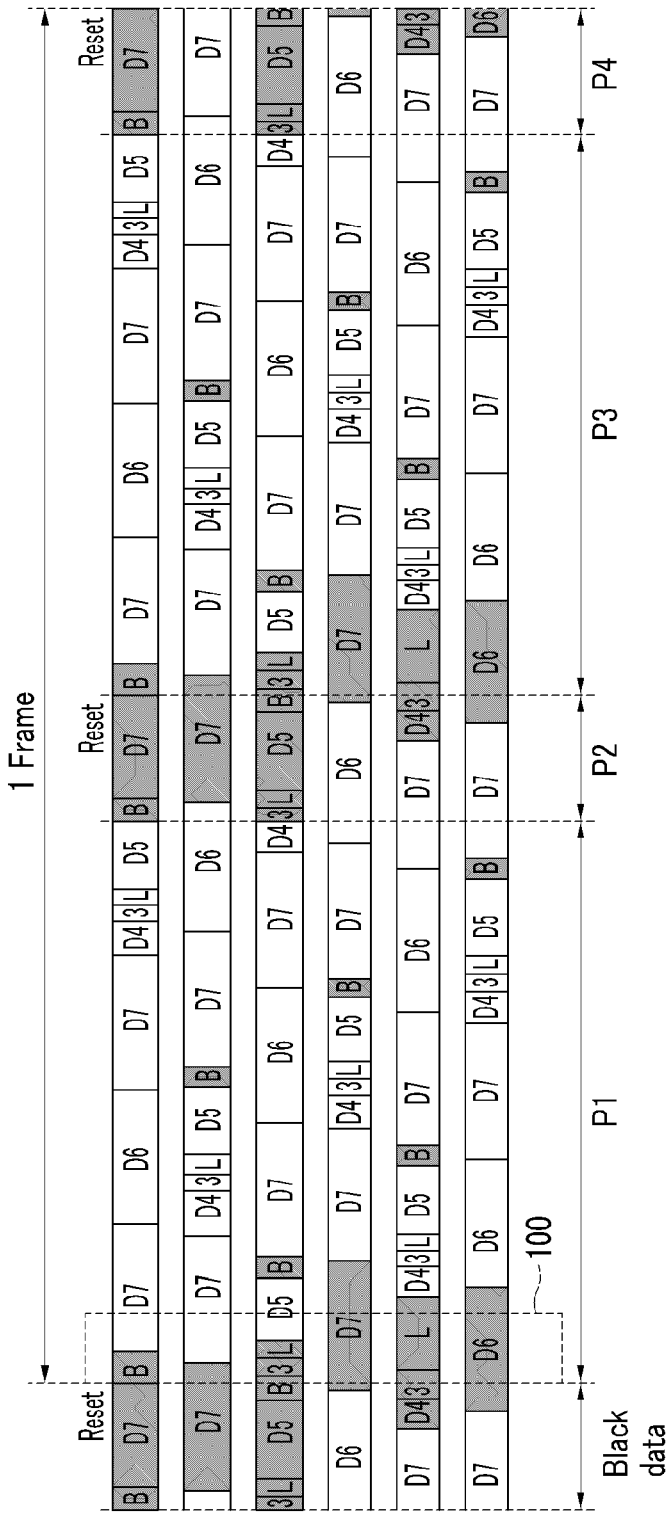
FIG. 6 is a driving waveform of a driving method of a three-dimensional or stereoscopic image according to an exemplary embodiment of the present invention.

FIG. 6 is a driving waveform diagram of a driving method of a three-dimensional or stereoscopic image according to an exemplary embodiment of the present invention. For better understanding and ease of description, it is shown that the display unit includes six scan lines. In FIG. 6, a plurality of blocks included to six scan lines in the up and down directions are arranged with the plurality of sub-frames according the time sequence corresponding to the scan line.

Referring to FIG. 6, in the digital driving according to an exemplary embodiment of the present invention, as the driving waveform of the driving method reducing the frequency, the period of 1 frame is 1/60 sec, and includes four periods.

The first period P1 and the third period P3 are the left-eye image display period supplied with the left eye data signal for the display and the right-eye image display period supplied with the right eye data signal, respectively, and the second period P2 and the fourth period P4 are the black image display periods in which the display unit does not emit the light.

In an exemplary embodiment of the present invention, the corresponding scan signals are generated in synchronization with the starting point of the plurality of sub-frames consisting of the first period P1 and the third period P3, and the corresponding pixels among the plurality of pixels included in the display unit are scanned according to the corresponding scan signal. Here, the sequence in which the plurality of scan signals corresponding to the plurality of sub-frames are generated during the first period P1 is the same as the sequence in which the plurality of scan signals corresponding to the plurality of sub-frames are generated during the third period P3.

Likewise, the corresponding scan signals are generated in synchronization with the starting point of the plurality of sub-frames included in the second period P2 and the fourth period P4. The corresponding pixels among the plurality of pixels included in the display unit are scanned according to the corresponding scan signal, and thereby the black data signal is transmitted such that the black image is displayed. Here, the sequence in which the plurality of scan signals corresponding to the plurality of sub-frames are generated during the second period P2 is the same as that of the fourth period P4.

The timing controller of the display device resets the counters at the viewpoint at which the second period P2 and the fourth period P4 of the black image display period are finished such that the initial viewpoint of the digital driving is returned, thereby starting the next period.

In FIG. 6, if the display device is operated during the first period P1 of the left-eye image display period, the second period P2 of the black image display period, the third period P3 of the right-eye image display period, and the fourth period P4 of the black image display period, the digital driving is again returned to the initial viewpoint such that the first period P1 is repeated.

In the display device according to the exemplary embodiment of FIG. 6, the number of sub-frames arranged to the plurality of scan lines may be 8.

For example, referring to FIG. 6, the first scan line is arranged with the sequence of the blank B, D7, D6, D7, D4, D3, L, and D5 sub-frames for the first period P1 of the left-eye image display period or the third period P3 of the right-eye image display period.

In FIG. 6, the sub-frame D3 having the relative short period is represented by "3".

FIG. 7 shows scan signal timing for the portion of the driving waveform diagram of a driving method according to an exemplary embodiment of the present invention of FIG. 6.

That is, in FIG. 6, the sub-frames included in six scan lines are arranged, and FIG. 7 elongates and shows the sub-frame block 100 corresponding to the predetermined period from the viewpoint that the first period P1 as the left-eye image display period is started, and shows the driving timing of the scan signal in synchronization with the viewpoint of the corresponding sub-frame during the predetermined period.

Referring to FIG. 7, the scan signal G1 transmitted to the first scan line among six scan lines generates the pulse of the gate on voltage level in synchronization with the viewpoint T00 in which the blank sub-frame B is started.

The reason that the gate on voltage level of FIG. 7 is the low level is because the plurality of pixels of the display device according to the exemplary embodiment of the present invention shown in FIG. 2 are made of PMOS transistors.

If the scan signal G1 is transmitted with the first scan line, the plurality of pixels included to the first scan line are scanned corresponding to the pulse of the gate on voltage level. Here, the data signal transmitted to the blank sub-frame B is the black data signal such that the plurality of pixels scanned during the period of the blank sub-frame B do not emit the light.

Next, the predetermined time is passed such that the scan signal G3 supplied to the third scan line generates the pulse of the low level in synchronization with the viewpoint T10.

If the scan signal G3 is transmitted to the third scan line, the plurality of pixels included in the third scan line are scanned corresponding to the pulse of the low level. The plurality of pixels included in the third scan line receive the left eye data signal during the period of the corresponding sub-frame D3, thereby displaying the image according thereto.

Likewise, the scan signal G5 supplied to the fifth scan line, the scan signal G2 supplied to the second scan line, the scan signal G3 supplied to the third scan line, the scan signal G1 supplied to the first scan line, and the scan signal G3 supplied to the third scan line sequentially generate the pulse of the low level in synchronization of the viewpoints of T11, T12, T13, T14, and T15 according to the passage of the time.

While not required in all aspects, aspects of the invention can be implemented using software and/or firmware encoded on a computer readable medium and implemented using computers and/or processors. Accordingly, the plurality of pixels included in the corresponding scan line transmitted with the corresponding scan signal receive the left eye data signal during the corresponding sub-frame period and emit the light, thereby displaying the left-eye image.

The right-eye image is also displayed through the above-described method during the right-eye image display period.

While this invention has been described in connection with what is presently considered to be exemplary embodiments, it is to be understood that the invention is not limited to the disclosed embodiments. A person having ordinary skill in the art can change or modify the described embodiments without departing from the scope of the present invention, and it will be understood that the present invention should be construed to cover the modifications or variations. Further, the material of each of the constituent elements described in the specification can be readily selected from among various known materials and replaced thereby by a person having ordinary skill in the art. Further, a person having ordinary skill in the art can omit some of the constituent elements described in the specification without deteriorating performance or can add constituent elements in order to improve performance. In addition, a person having ordinary skill in the art may change the sequence of the steps described in the specification according to process environments or equipment. Accordingly, the scope of the present invention should be determined not by the above-described exemplary embodiments, but by the appended claims and their equivalents.

What is claimed is:
1. A display device comprising:
a scan driver for transmitting a plurality of scan signals to a plurality of scan lines;
a data driver for transmitting a plurality of data signals to a plurality of data lines;
a display unit including a plurality of pixels connected to corresponding scan lines among the plurality of scan lines and corresponding data lines among the plurality of data lines, and respectively for receiving corresponding data signals among the plurality of data signals when the plurality of pixels are selected with corresponding scan signals among the plurality of scan signals; and
a timing controller for
controlling the scan driver and the data driver,
dividing one frame period into a first viewpoint image display period comprising at least two first sub-frames having different emitting times, a second viewpoint image display period comprising at least two second sub-frames having different emitting times, and a black image display period comprising at least one black sub-frame,
generating first viewpoint image data signals corresponding to the first viewpoint image display period, second viewpoint image data signals corresponding to the second viewpoint image display period, and a black image data signal corresponding to the black image display period, and
supplying the first viewpoint image data signals, the second viewpoint image data signals, and the black image data signal to the data driver,
wherein the black image display period is shorter than the first viewpoint image display period and the second viewpoint image display period, and a black data signal of the plurality of data signals corresponds to the black image data signal and causes the plurality of pixels to not emit light.

2. The display device of claim 1, wherein the first viewpoint image data signals and the second viewpoint image data signals are left eye image data signals and right eye image data signals, respectively.

3. The display device of claim 1, wherein the data driver is further configured to receive
the first viewpoint image data signals to generate a plurality of first viewpoint data signals of the plurality of data signals,
the second viewpoint image data signals to generate a plurality of second viewpoint data signals of the plurality of data signals, and
the black image data signal to generate the black data signal.

4. The display device of claim 3, wherein
the scan driver is further configured to transmit first scan signals of the plurality of scan signals corresponding to the at least two first sub-frames to the plurality of scan lines, and
the data driver is further configured to supply the plurality of first viewpoint data signals to the plurality of data lines when the first scan signals are transmitted to the plurality of scan lines.

5. The display device of claim 3, wherein
the scan driver is further configured to transmit second scan signals of the plurality of scan signals corresponding to the at least two second sub-frames to the plurality of scan lines, and
the data driver is further configured to supply the plurality of second viewpoint data signals to the plurality of data lines when the second scan signals are transmitted to the plurality of scan lines.

6. The display device of claim 3, wherein
the at least one black sub-frame includes a plurality of black sub-frames,
the scan driver is further configured to transmit black scan signals of the plurality of scan signals corresponding to the plurality of black sub-frames to the plurality of scan lines, and
the data driver is further configured to supply the black data signal to the plurality of data lines when the black scan signals are transmitted to the plurality of scan lines.

7. The display device of claim 1, wherein
the timing controller is further configured to supply the first viewpoint image data signals during the at least two first sub-frames arranged in a first sequence, and to supply the second viewpoint image data signals during the at least two second sub-frames arranged in a second sequence, and
the first sequence is the same as the second sequence.

8. The display device of claim 7, wherein the at least two first sub-frames and the at least two second sub-frames each include at least one blank sub-frame where the data driver is further configured to supply the black data signal to the plurality of data lines.

9. The display device of claim 7, wherein
the at least one black sub-frame comprises at least two black sub-frames,
the timing controller is further configured to supply the black image data signal during the at least two black sub-frames, and
an arrangement of the at least two black sub-frames is the same as an arrangement of a subset of the at least two first sub-frames and the at least two second sub-frames.

10. The display device of claim 9, wherein the black image display period is longer than a longest sub-frame among the at least two first sub-frames and the at least two second sub-frames.

11. The display device of claim 9, wherein the arrangement of the at least two black sub-frames frames is the same as an initial arrangement of the at least two first sub-frames and the at least two second sub-frames.

12. The display device of claim 1, wherein the black image display period starts where each of the first viewpoint image display period and the second viewpoint image display period finish.

13. A method of driving a display device in which a plurality of pixels are included, wherein one frame period is divided into a first viewpoint image display period, a second viewpoint image display period, and a black image display period, the first viewpoint image display period including a plurality of first sub-frames having different emitting times, the second viewpoint image display period including a plurality of second sub-frames having different emitting times, and the black image display period including a plurality of black sub-frames, the method comprising:
generating and supplying first viewpoint image data signals, second viewpoint image data signals, and a black image data signal respectively corresponding to the first viewpoint image display period, the second viewpoint image display period, and the black image display period;
emitting light from the plurality of pixels during the plurality of first sub-frames according to the first viewpoint image data signals;
not emitting light from the plurality of pixels during the plurality of black sub-frames according to the black image data signal; and
emitting light from the plurality of pixels during the plurality of second sub-frames according to the second viewpoint image data signals,
wherein the black image display period is shorter than the first viewpoint image display period and the second viewpoint image display period.

14. The method of claim 13, wherein the first viewpoint image data signals and the second viewpoint image data signals are left eye image data signals and right eye image data signals, respectively.

15. The method of claim 13, wherein the black image data signal is for causing the plurality of pixels to not emit light.

16. The method of claim 13, wherein the generating and the supplying of the first viewpoint image data signals, the second viewpoint image data signals, and the black image data signal comprises:
generating, by a timing controller of the display device, the first viewpoint image data signals, the second viewpoint image data signals, and the black image data signal, and supplying, by the timing controller, the first viewpoint image data signals, the second viewpoint image data signals, and the black image data signal to a data driver of the display device; and
receiving, by the data driver, the first viewpoint image data signals to generate a plurality of first viewpoint data signals, the second viewpoint image data signals to generate a plurality of second viewpoint data signals, and the black image data signal to generate a black data signal.

17. The method of claim 16, further comprising supplying, by the data driver, the plurality of first viewpoint data signals to a plurality of data lines connected to the data driver while transmitting, from a scan driver of the display device, scan signals corresponding to the plurality of first sub-frames to a plurality of scan lines.

18. The method of claim 16, further comprising supplying, by the data driver, the plurality of second viewpoint data signals to a plurality of data lines connected to the data driver while transmitting, from a scan driver of the display device, scan signals corresponding to the plurality of second sub-frames to a plurality of scan lines.

19. The method of claim 16, further comprising supplying, by the data driver, the black data signal to a plurality of data lines connected to the data driver while transmitting, from a scan driver of the display device, scan signals corresponding to the plurality of black sub-frames to a plurality of scan lines.

20. The method of claim 13, further comprising transmitting a plurality of first scan signals corresponding to the plurality of first sub-frames in the same sequence as transmitting a plurality of second scan signals corresponding to the plurality of second sub-frames.

21. The method of claim 20, further comprising supplying, by a data driver of the display device, a black data signal for causing the plurality of pixels to not emit light during at least one blank sub-frame of the plurality of first sub-frames and of the plurality of second sub-frames.

22. The method of claim 20, further comprising transmitting a plurality of black scan signals corresponding to the plurality of black sub-frames in the same arrangement as transmitting a subset of the plurality of first scan signals and the plurality of second scan signals.

23. The method of claim 20, further comprising transmitting a plurality of black scan signals corresponding to the plurality of black sub-frames in the same arrangement as an initial arrangement of transmitting the plurality of first scan signals and the plurality of second scan signals.

24. The method of claim 20, wherein the black image display period is longer than a longest sub-frame among the plurality of first sub-frames and the plurality of second sub-frames.

25. A display device comprising:
a display unit including a plurality of pixels connected to scan lines and data lines;
a scan driver for supplying scan signals to the scan lines and driving the scan lines;
a data driver for supplying data signals to the data lines and driving the data lines; and
a timing controller for
controlling the scan driver and the data driver, and
generating a black image data signal corresponding to a black image display period comprising at least one black sub-frame when a first viewpoint image display period comprising at least two first sub-frames having different emitting times and a second viewpoint image display period comprising at least two second sub-frames having different emitting times are completed,
wherein the black image data signal is for controlling the data driver to transmit a black data signal for causing the pixels to not emit light, and
wherein the black image display period is shorter than the first viewpoint image display period and the second viewpoint image display period.

26. The display device of claim 25, wherein the timing controller is further configured to generate left eye image data signals corresponding to the first viewpoint image display period and right eye image data signals corresponding to the second viewpoint image display period.

27. The display device of claim 25, wherein the data driver is further configured to receive first viewpoint image data signals corresponding to the first viewpoint image display period to generate a plurality of first viewpoint data signals, second viewpoint image data signals corresponding to the second viewpoint image display period to generate a plurality of second viewpoint data signals, and the black image data signal to generate the black data signal.

\* \* \* \* \*